US007983969B2

(12) United States Patent
Hagerman (10) Patent No.: US 7,983,969 B2
(45) Date of Patent: Jul. 19, 2011

(54) MONEY MARKET TRADING PLATFORM

(75) Inventor: George William Hagerman, Denver, CO (US)

(73) Assignee: Cachematrix Technology Services, LLC, Denver, CO (US)

( * ) Notice: Subject to any disclaimer, the term of this patent is extended or adjusted under 35 U.S.C. 154(b) by 1052 days.

(21) Appl. No.: 11/071,064

(22) Filed: Mar. 3, 2005

(65) Prior Publication Data

US 2006/0200393 A1    Sep. 7, 2006

(51) Int. Cl.
*G06Q 40/00* (2006.01)
(52) U.S. Cl. .......................................... 705/35; 705/37
(58) Field of Classification Search ................... 705/35, 705/36, 37
See application file for complete search history.

(56) References Cited

U.S. PATENT DOCUMENTS

| | | | |
|---|---|---|---|
| 5,689,650 A * | 11/1997 | McClelland et al. | 705/36 R |
| 5,893,079 A | 4/1999 | Cwenar | 705/36 |
| 6,233,566 B1 | 5/2001 | Levine et al. | |
| 6,505,174 B1 | 1/2003 | Keiser et al. | |
| 6,513,019 B2 | 1/2003 | Lewis | |
| 6,556,976 B1 | 4/2003 | Callen | |
| 7,013,291 B1 * | 3/2006 | Green | 705/31 |
| 7,146,333 B2 * | 12/2006 | Hamer et al. | 705/36 R |
| 7,333,951 B1 * | 2/2008 | Corning et al. | 705/36 R |
| 7,567,935 B2 * | 7/2009 | Tell et al. | 705/37 |
| 2001/0034678 A1 | 10/2001 | Lerner et al. | 705/25 |
| 2002/0138387 A1 * | 9/2002 | Griffin | 705/36 |
| 2003/0023535 A1 * | 1/2003 | Hoffman | 705/36 |
| 2003/0144942 A1 | 7/2003 | Sobek | 705/36 |
| 2003/0225662 A1 | 12/2003 | Horan et al. | 705/36 |
| 2003/0225663 A1 | 12/2003 | Horan et al. | 705/37 |
| 2004/0002913 A1 * | 1/2004 | Breen et al. | 705/37 |
| 2004/0030636 A1 * | 2/2004 | Sommer | 705/37 |
| 2005/0021443 A1 | 1/2005 | Beard et al. | 705/37 |
| 2005/0187857 A1 * | 8/2005 | Tull, Jr. | 705/37 |
| 2006/0015425 A1 | 1/2006 | Brooks | 705/35 |
| 2006/0167786 A1 | 7/2006 | Gambir et al. | 705/37 |

OTHER PUBLICATIONS

Sungard, STN Money Markets, Case Studies; SunGard 2002-2005; http://www.sungard.com/products_and_services/sfn/stn_money_markets/information/casestudies.htm (Dec. 7, 2004).
International Search Report and Written Opinion of the International Searching Authority, application No. PCT/US2007/083887, dated Mar. 28, 2008.

* cited by examiner

*Primary Examiner* — James A Kramer
*Assistant Examiner* — Hao Fu
(74) *Attorney, Agent, or Firm* — Seyfarth Shaw LLP; Richard P. Gilly (57) ABSTRACT

A money market trading platform provides institutional investors with comprehensive on-line analysis, account management, and on-line money market trading capabilities. An institutional investor's computer is connected via a communication network to a bank or broker's computer. The bank or broker's computer is connected via a communication network to a money market trading system or to a financial services, and stores information about the institutional investor and the accounts held in that investor's name. The trading platform allows institutional investors to log on, check account balances, transfer funds within accounts and from outside accounts, research money market investments, and purchase, redeem and exchange shares of money market funds.

6 Claims, 6 Drawing Sheets

MONEY MARKET TRADING PLATFORM

TECHNICAL FIELD

This invention relates to trading platforms for institutional investors, and more particularly to money market trading platforms for institutional investors.

BACKGROUND

Institutional investors are investors that trade on behalf of institutional clients such as corporations, labor unions, retirement funds, and college savings or 529 plans. The trading habits and needs of institutional investors are quite different from the trading habits and needs of individual investors. For example, institutional investors generally manage large sums of money, and consequently daily purchase and redeem millions and tens of millions of dollars worth of money market funds. Similarly, institutional investors are often active market participants, and possess expert knowledge about the markets in which they trade. They often use that knowledge to capitalize on breaking news that effects market valuations and performance. Given the size and volume of their daily trading activity, settling the accounts of institutional investors often requires regular transfers of large amounts of cash. This is usually done via an electronic fund or wire transfer, and separate wire transfers are generally required every time a fund is purchased. Thus, when several fund purchases are made throughout a trading day, several wire transfers are required to settle those purchase transactions. Institutional investors are also subject to regulatory restrictions not placed on ordinary investors, which put limits on how institutional investors can invest their funds. As a result, they often need to know certain information that non-institutional investors do not need to know. For example, to ensure compliance with self-regulatory rules, institutional investors often need to know the relative size of the positions they take in given money market funds. While securities trading systems are known in the art, none are generally designed to provide the types of information and functionality that are needed by institutional investors, and particularly by institutional investors who trade in money market funds.

SUMMARY

A money market trading platform implemented as a computer program running on a computer is configured to deliver information to an institutional money market investor. The information delivered to the investor may include one or more of the following: the percentage of a money market fund that is owned by the institutional investor, a daily sub-total of the purchases made by the institutional investor that require settlement, or the names of first and second money market funds between which the institutional investor can exchange money or funds.

In one aspect, the money market trading platform provides a method for aggregating a plurality of money market purchases made by an institutional investor in the course of a trading day. The method involves receiving a plurality of requests to purchase one or more money market funds; determining the amount needed to make each purchase in each of the plurality of requests, and adding the amount to a daily purchase sub-total. At the end of the trading day, the institutional investor can settle his or her account in a single transaction, e.g., by making a single wire-transfer payment in the amount of the daily purchase sub-total.

In another aspect, the money market trading platform provides a method for determining the percentage of a money market fund that is owned by an institutional investor. The method involves receiving a number representing the current assets under management for a money market fund in which the institutional investor has a position; receiving a number representing the current amount of money the institutional investor has invested in the money market fund; and dividing the number representing the current amount the institutional investor has invested in the money market fund by the number representing the current assets under management for the money market fund.

In another aspect, the money market trading platform provides a method for allowing an institutional investor to exchange shares held in money market funds. The method involves receiving a request from an institutional investor to exchange shares in a first money market fund for shares in a second money market fund, and verifying that the investor has enough invested in the first money market fund to cover the amount sought to be purchased in the second money market fund. Upon verifying that the investor has enough vested in the first money market fund, the method involves redeeming the requested amount in the first money market fund, and using the proceeds to purchase the same amount in the second money market fund.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The money market trading platform of the present invention provides institutional investors with comprehensive on-line analysis, account management, and on-line money market trading capabilities. It also allows institutional investors to exchange or transfer money from one money market fund to another. In one embodiment, an institutional investor's computer workstation is connected via the Internet or other communication network to a bank or broker's computer system. The bank or broker's computer system is in turn connected through the Internet or other communication network to one or more money market funds or money market trading systems. The bank or broker maintains an omnibus account for placing trades with the one or more money market funds or money market trading systems, and maintains information about each institutional investor, and information about each investor's accounts on its computer or computer system.

In one aspect, the trading platform of the present invention allows an institutional investor or user to log onto the trading platform with a unique user identifier ("user ID") and password. Once logged on, the user can check account balances, transfer funds from outside accounts (e.g., via wire transfer), research potential money market investments, and purchase, redeem and exchange shares of money market funds. In one embodiment, the money market activities, transactions, and other functionality available to the user or institutional investor are suitably displayed or made accessible via a graphical user interface. The interface allows the user to view interrelationships between financial information and financial operations, and thereby facilitates analysis and financial transactions that are based, at least in part, on viewing the financial information and operational interrelationships.

Once logged-on, the trading platform provides useful account information to users (institutional investors). The account information includes the names and numbers of all of the accounts that are owned by the user, and the balance of the portfolio managed by the user (i.e., the sum of all of the money that is held in all of the user's accounts). For example, the trading platform can provide information indicating that an institutional investor has two accounts worth a total of approximately $795 million dollars—a pension fund account worth approximately $545 million dollars and a self-insurance account worth approximately $250 million dollars. For each of the investors accounts, the trading platform displays the date the account was opened, a portion of the tax identification number associated with the account, the names of all of the money market funds in which positions are held, the amount of money held in each money market fund, and the total amount of money held in the account.

The trading platform allows institutional investors to research and purchase money market funds. Funds can be researched by displaying all of the funds available for purchase through the bank or broker, or by displaying only those funds that satisfy certain filter criteria. Displayed funds are generally displayed together with the criteria that are used to filter the funds. These criteria can include the names of the funds, their ticker symbols, their CUSIP identifiers, the total assets under management ("AUM") for the fund, the current amount of the fund that is owned by the user (e.g., in both absolute terms and as a percentage of AUM), the 1-day, 7-day, and 30-day fund yields, various fund ratings (e.g., Moody's, S&P, Fitch & NAIC), the type of fund (e.g., prime, municipal or treasury), the fund's date of inception, expense ratio, etcetera. Displayed funds can generally be sorted by the filter criteria. For example, the funds can be sorted in ascending or descending order to show which funds have the highest or lowest 7-day effective yield.

Figure 1:
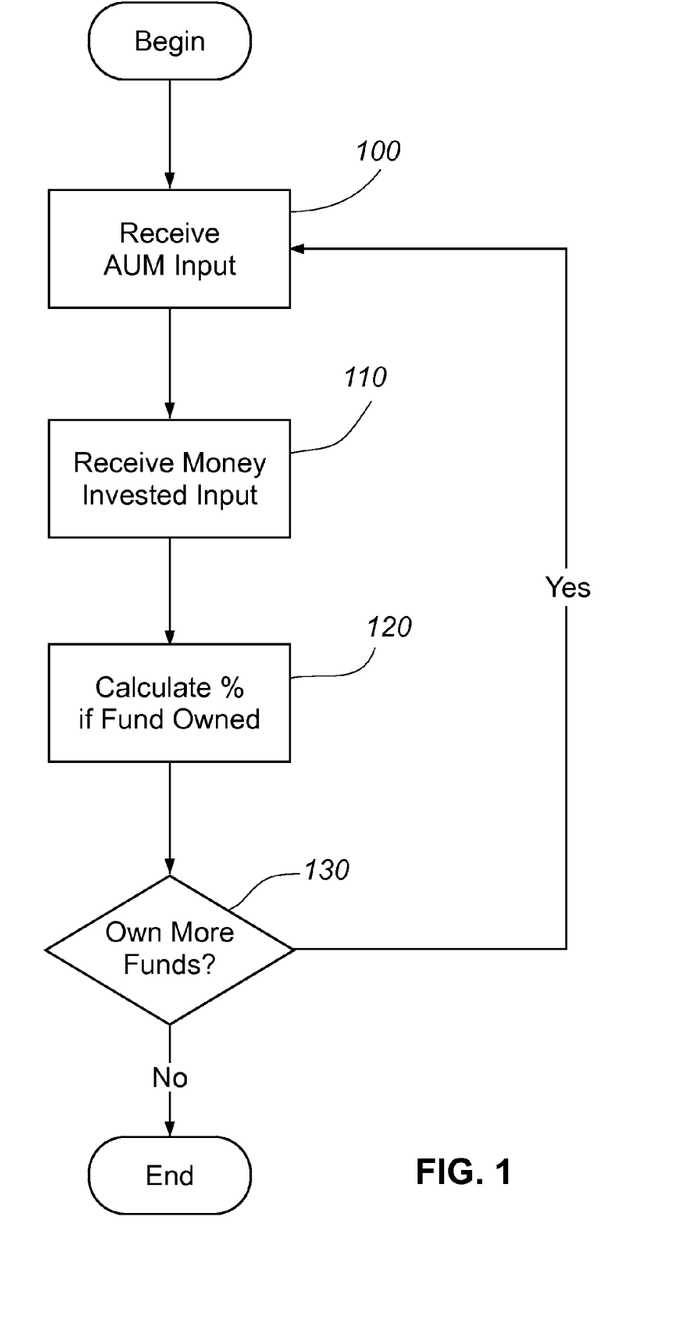
FIG. 1 is a flow chart depicting a method for determining the percentage of a money market fund that is owned by an institutional investor.

Among the information the trading platform can display to a user or institutional investor is the percentage of each fund that is owned by that investor. The trading platform determines this percentage as shown in FIG. 1. On a periodic basis, which is typically daily, the trading platform receives input from each money market fund that can be traded indicating the total assets that fund currently has under management. This information can be stored in a database that is associated with the trading platform, or it can be retrieved whenever an institutional investor requests a display of the percentage of funds owned. The trading platform determines the percentage of each fund owned by receiving input for each fund indicating that fund's current assets under management (step 100) and the amount of money the investor currently has invested in the fund (step 110). After determining the current assets under management and the amount the investor has invested in a fund, the platform determines the percentage of the fund owned by dividing the amount invested by the assets under management (step 120). The trading platform calculates and displays this percentage for each money market fund that is owned by the investor (step 130). When the investor maintains multiple accounts, the trading platform determines the percentage of fund owned for each of the investor's accounts. By determining and displaying the percentage of funds owned, the trading platform provides institutional investors with the needed means to monitor and ensure compliance with applicable regulatory rules, such as self-regulatory rules.

The trading platform also allows institutional investors to trade shares in one or more of the available money market funds by placing orders to purchase, redeem, or exchange shares. The orders can be placed, for example, by selecting an item in a drop down transaction menu that appears next to each fund's name. When the investor elects to redeem fund shares, the trading platform provides a text box, drop down menu, or other similar means for the investor to indicate the dollar amount that the investor wishes to redeem. The trading platform also provides a text box, drop down menu or other suitable means to allow the investor to identify the bank account to which the investor wishes the redemption proceeds to be deposited.

Figure 2:
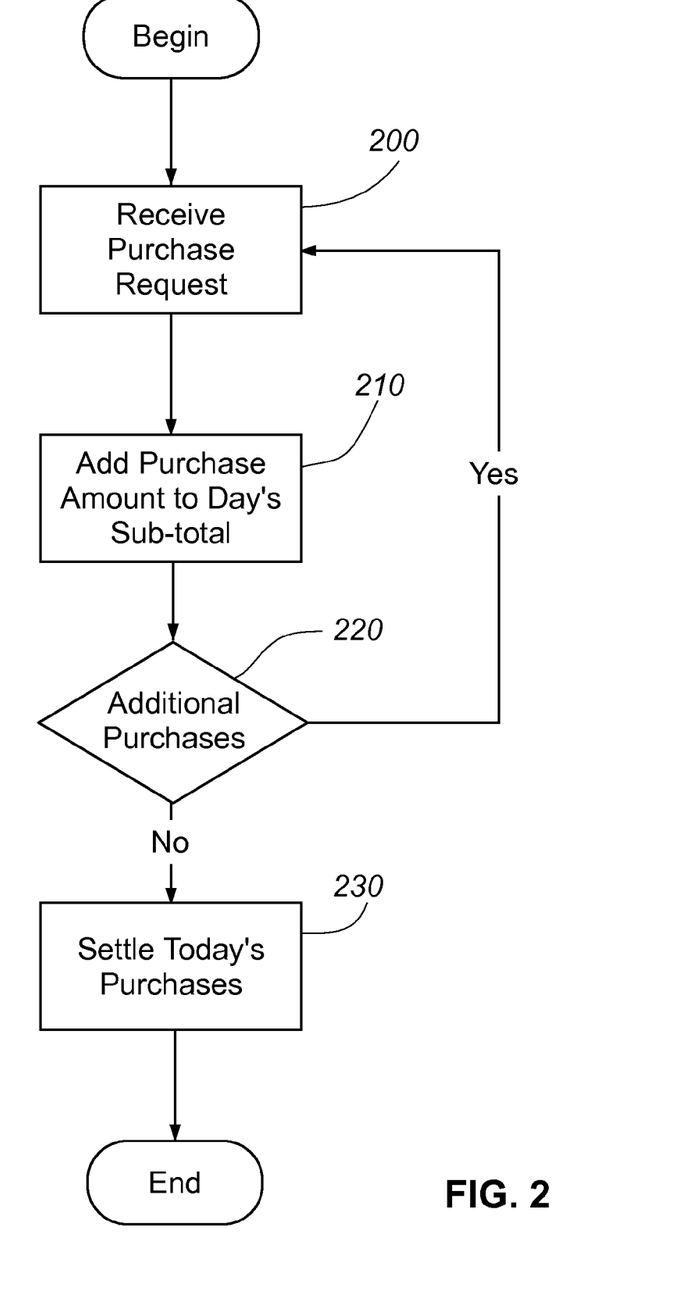
FIG. 2 is a flow chart depicting a method for aggregating the money market purchases of an institutional investor, thereby allowing the investor to settle his or her account a single time for the aggregate purchase amount.

When the investor elects to purchase shares, the trading platform provides a text box, drop down menu or other means for the investor to indicate the dollar amount of the fund that the investor wishes to purchase. The trading platform allows an investor to make multiple fund purchases over the course of a trading day, and to aggregate those purchases so that the investor can settle his or her account a single time at the end of the trading day via a single wire transfer. In one embodiment, as shown in FIG. 2, when the trading platform receives a purchase request (step 200), it adds the current purchase amount to a daily purchase sub-total (step 210). If additional purchases are made throughout the day (step 220), the trading platform receives those additional purchase requests (step 200), and adds the additional purchase amounts to the daily purchase sub-total (step 210). As a result, at the end of the trading day, the trading platform can determine the amount needed to settle the institutional investors account (step 230). This allows an institutional investor to settle his or her account in a single transaction, by ordering a single wire transfer in the amount of the final daily purchase sub-total, while making one or more purchases from one or more mutual funds throughout the trading day.

Figure 3:
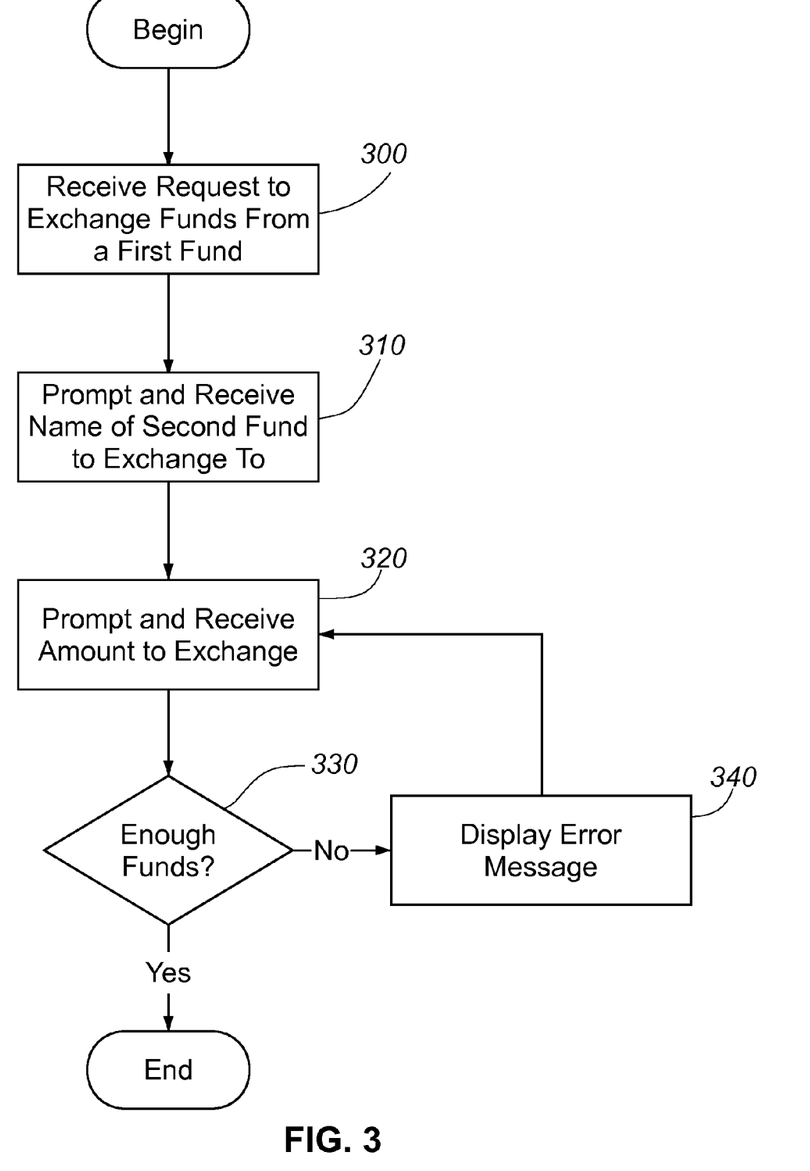
FIG. 3 is a flow chart depicting a method for allowing an institutional investor to exchange money market funds.

The trading platform also allows an institutional investor to exchange funds from one money market fund to another money market fund without depositing additional funds into his or her account. For example, as shown in an embodiment depicted in FIG. 3, the trading platform is configured to receive an investor request to exchange funds from a first money market fund (step 300). Upon receiving the request, the trading platform provides the investor with a text box, drop down menu or other means to indicate the name of a second money market fund in which the investor wishes to take a position by exchanging shares from the first money market fund (step 310). The trading platform then provides the investor with a text box, drop down menu or other means to indicate the dollar amount of funds that the investor wishes to exchange from the first money market fund to the second money market fund (step 320). Next, the trading platform verifies that the investor has a large enough position in the first money market fund to allow the desired exchange from the first money market fund to the second money market fund (step 330). If the first money market fund does not have sufficient funds, an error message is displayed (step 340), and the user is again prompted to enter a new dollar amount (step 320). When the investor enters a dollar amount that can be covered by the investor's position in the first money market fund, the trading platform completes the exchange of funds from the first money market fund to the second money market fund, without requiring a deposit of additional funds into the investor's account.

Figure 4:
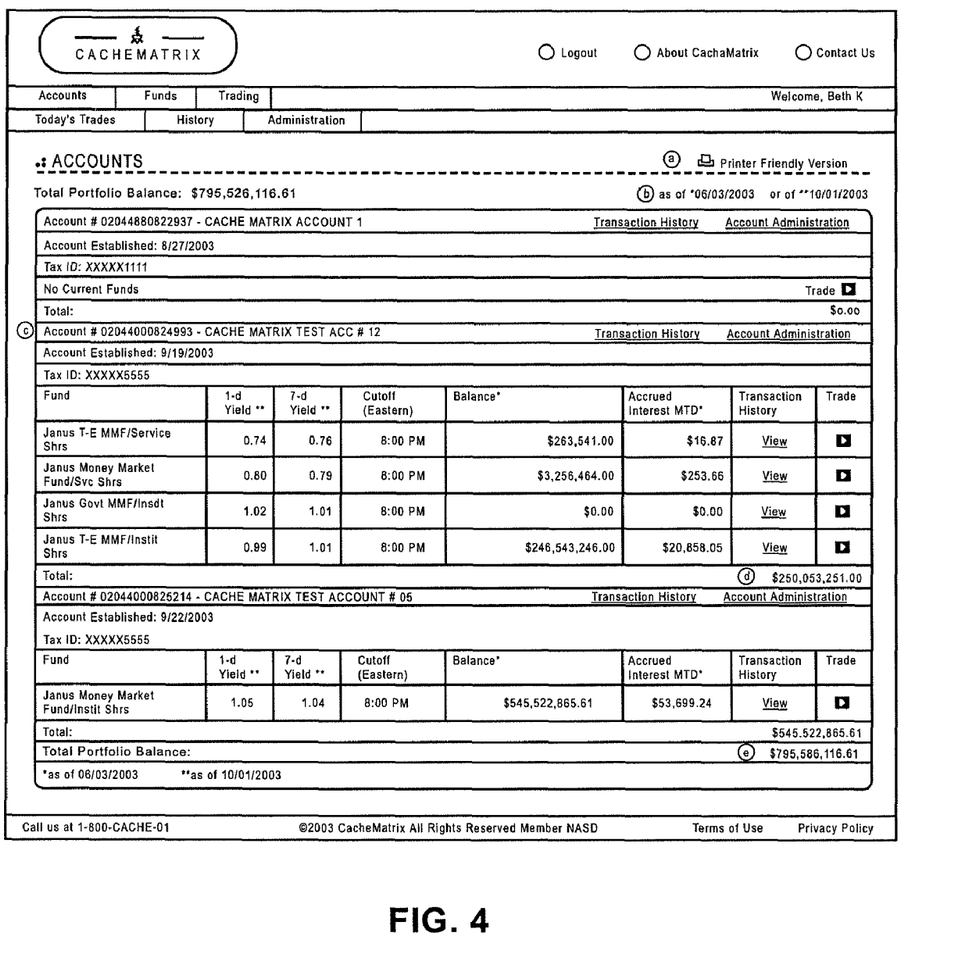
FIG. 4 is a screen shot showing an "Account" details section of one embodiment of the trading platform.

Each of the features of the money market trading platform described herein are accessible through interrelated areas that are displayed together or in a logical fashion as a web of linked documents. In one embodiment, each feature is available in a document that can be displayed to an institutional investor via a web browser or other suitable graphical user interface. For example, as shown in FIG. 4, the trading platform can display user account information such as the number and type of accounts, the holdings and total value of each account, and the total holdings in all accounts to an institutional investor that successfully logs-on to the trading platform. From the user account page, the institutional investor can administer his or her account through the "Administration" tab, review that days transactions through the "Today's Trades" tab, review even more transaction history through the "History" tab, search money market funds through the "Funds" tab, or trade funds through the "Trading" tab.

Figure 5:
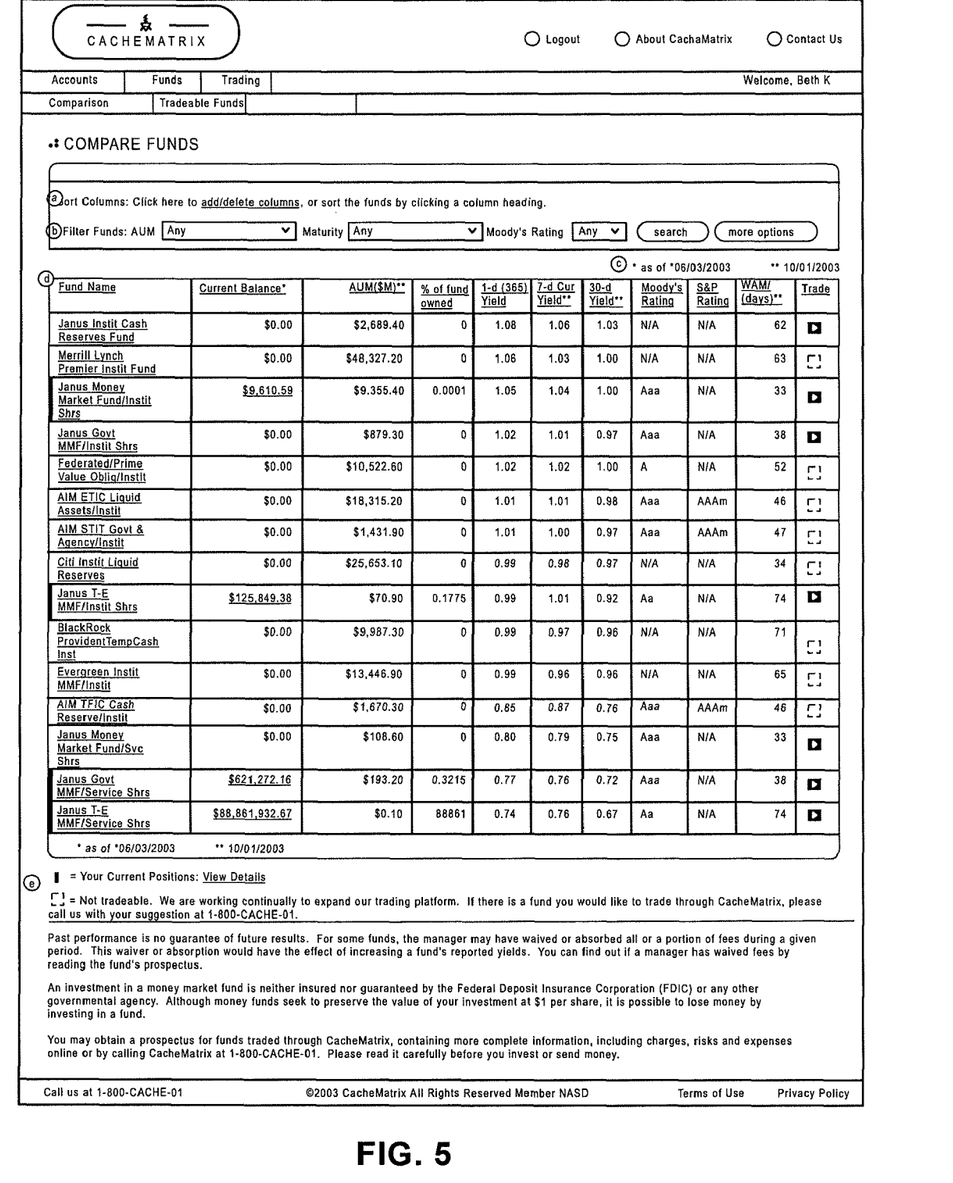
FIG. 5 is a screen shot showing a "Fund" comparison section of one embodiment of the trading platform.

As shown in FIG. 5, the trading platform allows an institutional investor to research all of the funds that are available for trading by selecting the "Funds" tab. When the "Funds" tab is selected, various information such as the money market fund name, current assets under management, and 1-day and 7-day yields are displayed. The institutional investor can customize the type of information that is displayed by adding or deleting columns of information. The institutional investor can also use the information that is displayed to filter, find, and display only those money market funds that are of interest to him or her. For example, the institutional investor can filter, find and display only those funds that are rated AAA by Moody's and that have more than $ 5 billion dollars in assets under management. From the "Funds" tab, the institutional investor can return to the "Accounts" tab to display all account information, or can select the "Trading" tab to purchase, redeem, or exchange money market funds.

Figure 6:
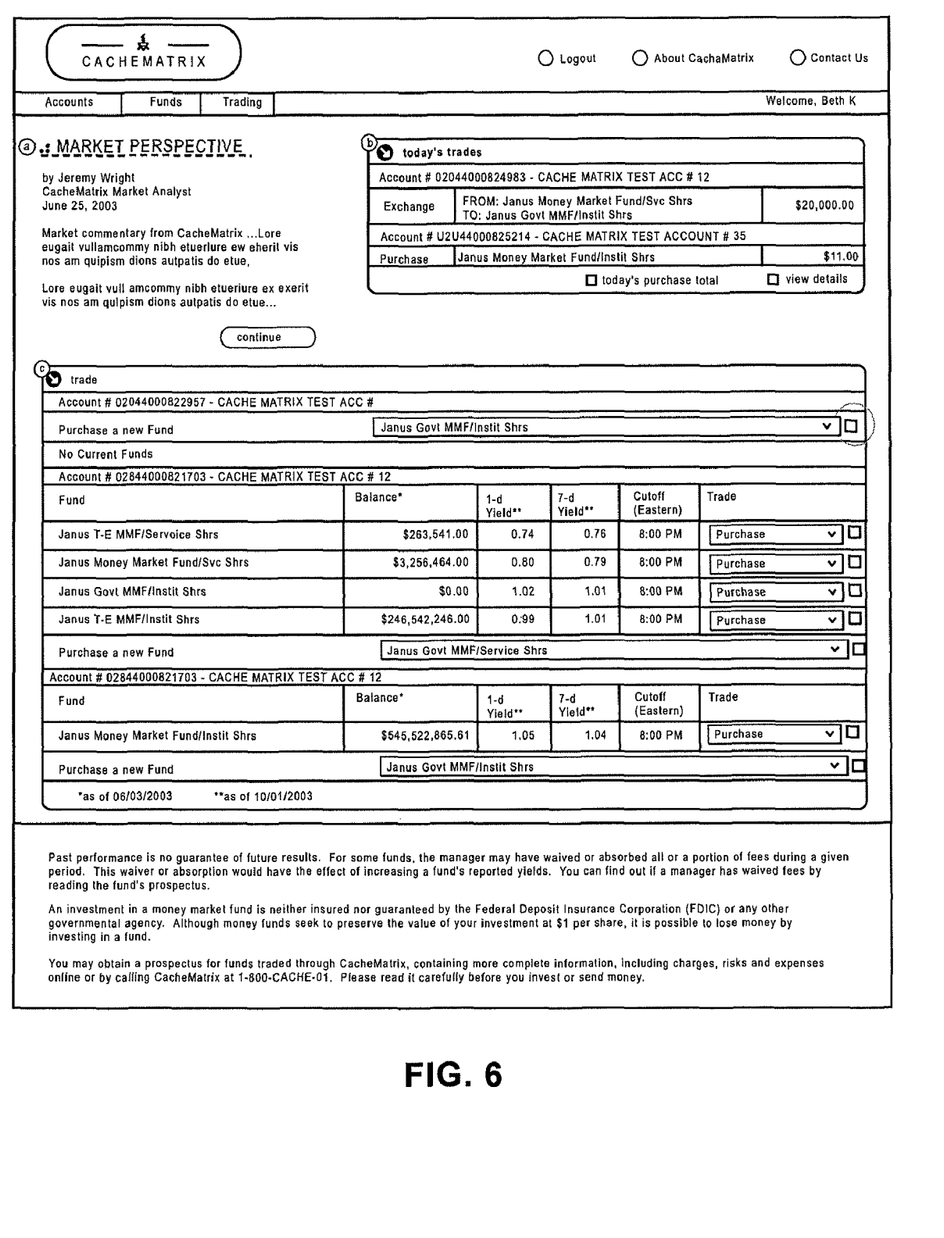
FIG. 6 is a screen shot showing a "Trading" funds section of one embodiment of 20 the trading platform.

As shown in FIG. 6, upon selecting the "Trading" tab, the institutional investor is presented with a summary of the day's trading activity, a drop down menu that allows the institutional investor to purchase a money market fund from a list of funds, and a list of account holdings. The list of account holdings includes a drop down menu that allows the institutional investor to alter his or her current account positions by purchasing, redeeming or exchanging those money market funds in which the institutional investor currently holds a position. For example, the institutional investor can add to a fund position by purchasing additional money market funds or can liquidate a fund position by redeeming all of the shares held in that money market fund. Upon purchasing additional money market funds, the trading platform displays a pop-up menu that shows the current daily purchase sub-total. By running and displaying a daily purchase sub-total, the trading platform allows the institutional investor to settle the days current trading activity by making a single wire transfer payment in the amount of the daily purchase sub-total as explained above with respect to FIG. 2.

The trading platform of the present invention is implemented on a bank or broker's computer or computer system. The bank or broker will generally maintain an omnibus account with one or more money market funds or money market trading systems to give the bank or broker's institutional investor clients access to the money market funds that are offered through the trading portal. When an institutional investor buys or redeems shares of a money market fund through the trading portal, the bank or broker purchases or redeems shares of that money market fund on behalf of the institutional investor by placing appropriate orders through its omnibus account. Because all money market fund purchases, redemptions and exchanges entered by institutional investor's through the trading portal are ultimately placed through the bank or broker's omnibus account, the bank or broker can net-out or conglomerate all of the orders placed by its institutional investor clients to each money market fund that is available for trading, and make a single or net trade with each fund to balance the bank or broker's omnibus account. In this way, the content of the bank or broker's omnibus account will reflect the net holdings of the institutional investor accounts that have access to and trade money market funds through the trading portal.

The trading platform can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The trading platform can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the trading platform can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, the steps of the invention can be performed in a different order and still achieve desirable results. While the trading platform was described in terms of a series of linked documents, the available features can be presented in a single viewable area such as in a single viewable document or a single window with multiple window panes. While the trading platform was described as being viewable through a custom graphical user interface, the platform can also be viewable through a convention web browser such as the Internet Explorer or Netscape Navigator web or similar such browsers. Accordingly, these, and other embodiments are within the scope of the following claims.

What is claimed is:

1. A method for managing percentage of money market funds owned by an institutional investor, comprising:

periodically receiving by at least one computer, a first number representing the current assets under management for each of a plurality of the funds;

receiving by the at least one computer a second number representing the current amount of money the institutional investor has invested in each of the funds;

dividing by the at least one computer the second number by the first number for each of the funds to determine the percentage of money market fund owned by the institutional investor for each of the funds;

filtering by the at least one computer said funds by the percentage;

displaying by the at least one computer a list of funds which satisfy a percentage filter criteria together with a corresponding percentage for each of the funds;

receiving a request by the at least one computer from the institutional investor to exchange funds from a first money market fund for funds in a second money-market fund, wherein the funds of the first and the second money market funds are both able to be exchanged by the institutional investor at the time of the request;

verifying by the at least one computer that the institutional investor has enough funds in the first money market fund to cover the size of the position the investor wishes to take in the second money-market fund;

in response to said verifying, said at least one computers redeeming sufficient funds in the first money market fund to cover the cost of the position the investor wishes to take in the second money market fund; and in response to said redeeming, said at least one computer using the redemption proceeds to purchase funds in the second money market fund, without requiring another investor to perform the exchange.

2. The method of claim 1, further comprising:

generating, by the at least one computer, a running daily sub-total of the investor's purchases exclusive of redemptions and exchanges, the sub-total adapted for settling purchases in a single end of day transaction exclusive of redemptions and exchanges.

3. A computer program product, stored on a non-transitory machine-readable medium, the computer program product comprising instructions configured operable to cause a programmable processor on at least one computer to manage percentage of money market funds owned by an institutional investor by performing the steps of:

periodically receiving by at least one computer, a first number representing the current assets under management for each of a plurality of the funds;

receiving by the at least one computer a second number representing the current amount of money the institutional investor has invested in each of the funds;

dividing by the at least one computer the second number by the first number for each of the funds to determine the percentage of money market fund owned by the institutional investor for each of the funds;

filtering by the at least one computer said funds by the percentage;

displaying by the at least one computer a list of funds which satisfy a percentage filter criteria together with a corresponding percentage for each of the funds;

receiving a request by the at least one computer from the institutional investor to exchange funds from a first money market fund for funds in a second money-market fund, wherein the funds of the first and the second money market funds are able to be exchanged by the same institutional investor at the time of the request;

verifying by the at least one computer that the institutional investor has enough funds in the first money market fund to cover the size of the position the investor wishes to take in the second money-market fund;

in response to said verifying, said at least one computers redeeming sufficient funds in the first money market fund to cover the cost of the position the investor wishes to take in the second money market fund; and in response to said redeeming, said at least one computer using the redemption proceeds to purchase funds in the second money market fund, without requiring another investor to perform the exchange.

4. The computer program product of claim 3 further comprising program instructions configured to cause said processor to perform the steps of:

generating, by the at least one computer, a running daily sub-total of the investor's purchases exclusive of redemptions and exchanges, the sub-total adapted for settling purchases in a single end of day transaction exclusive of redemptions and exchanges.

5. A system for managing at least one money market fund, comprising:

at least one computer configured to periodically receive a first number representing the current assets under management for each of a plurality of the funds;

said at least one computer configured to receive a second number representing the current amount of money the institutional investor has invested in each of the funds;

said at least one computer configured to divide the second number by the first number for each of the funds to determine a percentage of money market fund owned by the institutional investor for each of the funds;

said at least one computer configured to filter said funds by the percentage;

said at least one computer configured to display a list of funds which satisfy a percentage filter criteria together with a corresponding percentage for each of the funds;

said at least one computer configured to receive a request from the institutional investor to exchange funds from a first money market fund for funds in a second money-market fund, wherein the funds of the first and the second money market funds are both able to be exchanged by the same institutional investor at the time of the request;

said at least one computer configured to verify that the institutional investor has enough funds in the first money market fund to cover the size of the position the investor wishes to take in the second money-market fund;

said at least one computer configured to redeem sufficient funds in the first money market fund to cover the cost of the position the investor wishes to take in the second money market fund, in response to said verifying; and said at least one computer configured to use the redemption proceeds to purchase funds in the second money market fund in response to said redeeming, without requiring another investor to perform the exchange.

6. The system of claim 5, further comprising:

said at least one computer configured to generate a running daily sub-total of the investor's purchases exclusive of redemptions and exchanges, the sub-total adapted for settling purchases in a single end of day transaction exclusive of redemptions and exchanges.

* * * * *